US009154603B2

(12) United States Patent
Nago

(10) Patent No.: US 9,154,603 B2
(45) Date of Patent: Oct. 6, 2015

(54) COMMUNICATION APPARATUS UTILIZING A PLURALITY OF TRANSMISSION APPLICATIONS BASED ON A COMMUNICATION PARTNER

(75) Inventor: Hidetada Nago, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 721 days.

(21) Appl. No.: 12/796,442

(22) Filed: Jun. 8, 2010

(65) Prior Publication Data

US 2010/0315676 A1 Dec. 16, 2010

(30) Foreign Application Priority Data

Jun. 12, 2009 (JP) ................................ 2009-141388

(51) Int. Cl.
*G06F 3/12* (2006.01)
*H04M 1/725* (2006.01)
*H04N 1/00* (2006.01)

(52) U.S. Cl.
CPC .......... *H04M 1/7253* (2013.01); *H04N 1/00132* (2013.01); *H04N 1/00137* (2013.01); *H04N 1/00177* (2013.01); *H04N 1/00188* (2013.01); *H04N 1/00204* (2013.01); *H04N 2201/0015* (2013.01); *H04N 2201/0055* (2013.01); *H04N 2201/0082* (2013.01); *H04N 2201/0089* (2013.01)

(58) Field of Classification Search
USPC ....................................................... 358/1.15
See application file for complete search history.

(56) References Cited

U.S. PATENT DOCUMENTS

| | | | |
|---|---|---|---|
| 2003/0217138 A1* | 11/2003 | Shimba et al. | 709/223 |
| 2004/0002366 A1* | 1/2004 | Cromer et al. | 455/574 |
| 2004/0100374 A1* | 5/2004 | Menard et al. | 340/506 |
| 2006/0224801 A1* | 10/2006 | Chiu et al. | 710/70 |
| 2007/0236727 A1* | 10/2007 | Proust et al. | 358/1.15 |
| 2007/0268507 A1* | 11/2007 | Kim | 358/1.13 |
| 2008/0137131 A1* | 6/2008 | Cavill et al. | 358/1.15 |
| 2008/0261525 A1* | 10/2008 | Matsuo et al. | 455/41.2 |
| 2008/0301320 A1* | 12/2008 | Morris | 709/238 |
| 2009/0061841 A1* | 3/2009 | Chaudhri et al. | 455/420 |
| 2009/0113088 A1* | 4/2009 | Illowsky et al. | 710/62 |
| 2010/0061278 A1* | 3/2010 | McCoy | 370/277 |
| 2010/0222179 A1* | 9/2010 | Temple et al. | 482/8 |
| 2010/0274868 A1* | 10/2010 | Arroyo et al. | 709/212 |
| 2011/0211226 A1* | 9/2011 | Chang et al. | 358/1.15 |

FOREIGN PATENT DOCUMENTS

| | | |
|---|---|---|
| CN | 1536776 A | 10/2004 |
| JP | 7-152514 A | 6/1995 |
| JP | 2000-134441A A | 5/2000 |
| JP | 2001-157269 A | 6/2001 |
| JP | 2002-373130 A | 12/2002 |
| JP | 2003-209672A A | 7/2003 |
| JP | 2006-079266 A | 3/2006 |

* cited by examiner

*Primary Examiner* — Benjamin O Dulaney
(74) *Attorney, Agent, or Firm* — Canon USA, Inc. IP Division

(57) ABSTRACT

An apparatus includes a recognition unit configured to recognize a function included in a communication partner and a determination unit configured to determine processing, which the communication partner performs on transmission data, according to the recognized function and a type of the transmission data.

25 Claims, 11 Drawing Sheets

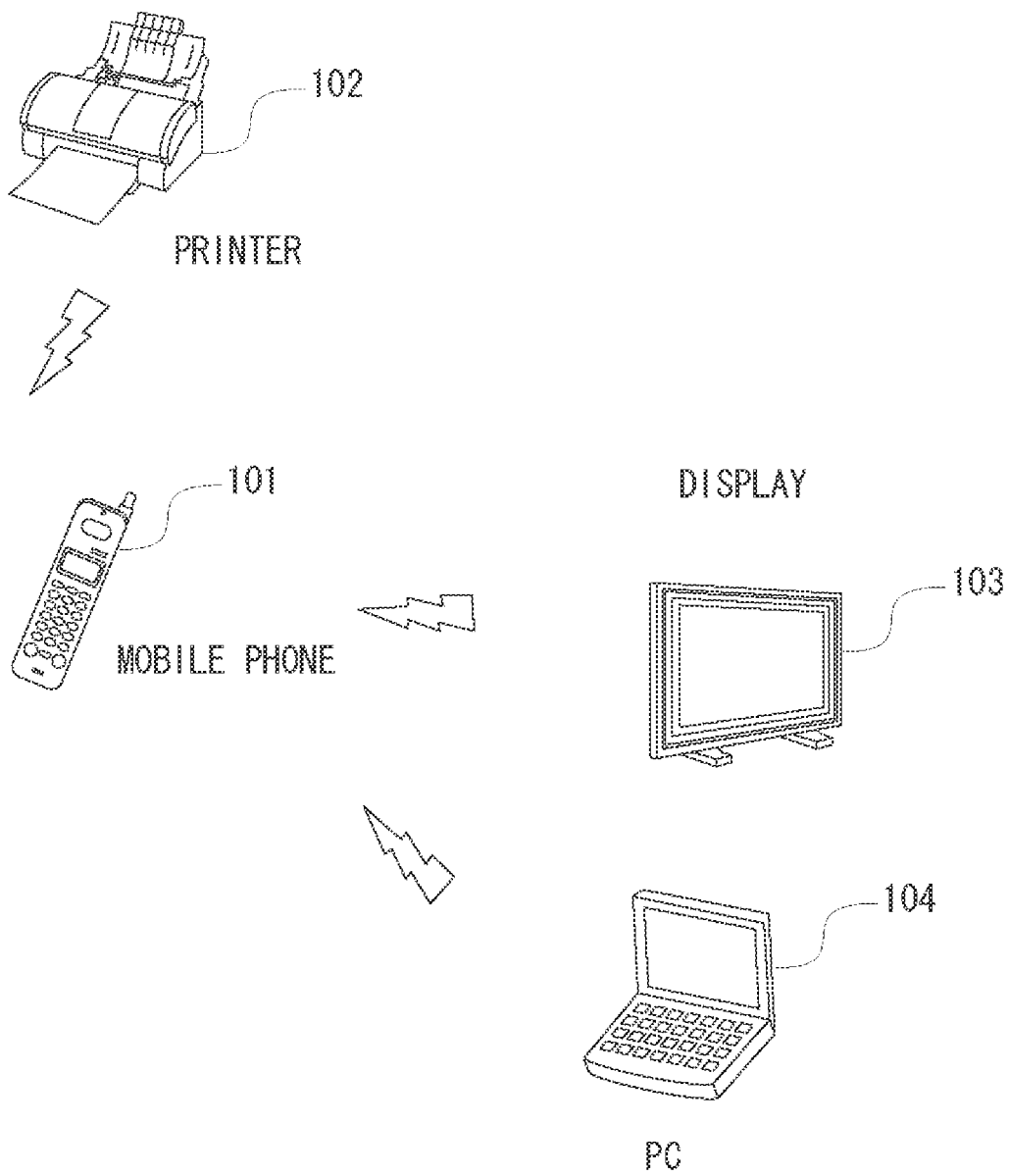

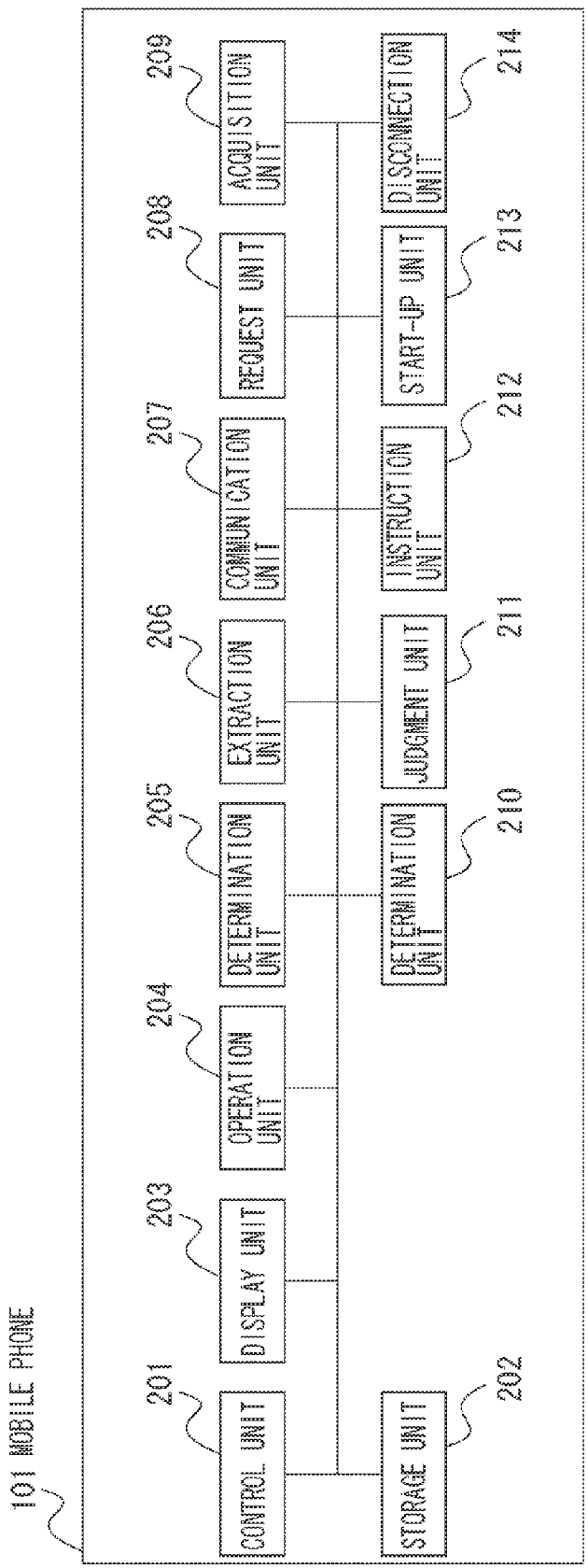

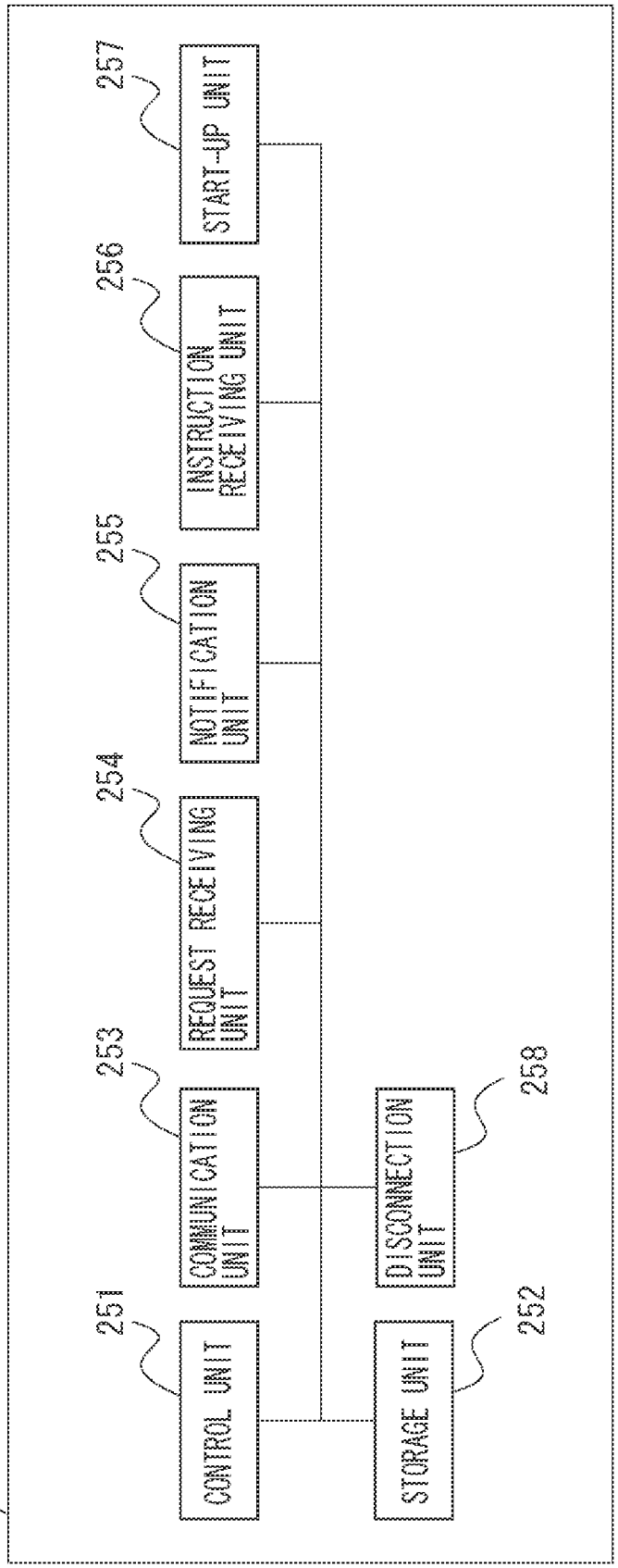

| | TRANSFER DATA TRANSMISSION APPLICATION | PRINT DATA TRANSMISSION APPLICATION | STREAMING DATA TRANSMISSION APPLICATION | DISPLAY DATA TRANSMISSION APPLICATION |
|---|---|---|---|---|
| SPREAD SHEET DATA | ○ | ○ | × | ○ |
| WORD PROCESSOR DATA | ○ | ○ | × | ○ |
| IMAGE DATA | ○ | ○ | × | ○ |
| MOVING IMAGE DATA | ○ | × | ○ | ○ |

301 CORRESPONDENCE TABLE

○ TRANSMISSION CANDIDATE APPLICATION
× NON-TRANSMISSION CANDIDATE APPLICATION

FIG. 4 picturc001.jpg
picturc002.jpg
picturc003.jpg
picturc004.jpg
matrix001.xls
matrix002.xls
document001.doc
movie001.mpg

COMMUNICATION APPARATUS UTILIZING A PLURALITY OF TRANSMISSION APPLICATIONS BASED ON A COMMUNICATION PARTNER

BACKGROUND OF THE INVENTION

1. Field of the Invention

The present invention relates to a determination of communication application.

2. Description of the Related Art

Conventionally, when transmitting image data from a personal computer (PC), which is a communication apparatus, to a printer and printing the image data, a user specifies the image data using a user interface (UI) of the PC and instructs the PC to print the image data. The PC starts a transmission application for printing according to the print instruction from the user, and transmits image data to the printer. When transmitting image data from the PC to a memory card and storing the image data, the user specifies the image data using the UI of the PC and instructs the PC to store the image data. The PC starts a transmission application for storing the data according to the storing instruction from the user, and transmits the image data to the memory card.

On the other hand, there are communication methods such as contactless integrated circuit (IC) card wireless communication and near field communication (NFC) which use electromagnetic induction, and TransferJet (registered trademark) which uses an induced electric field. In these communication methods, when a communication apparatus approaches another communication apparatus, communication can be established.

When performing communication using electromagnetic induction or an induced electric field, a user is to bring a communication apparatus close to a communication partner to establish communication. For example, when printing with a printer, a user brings a communication apparatus close to the printer to establish communication. However, when a conventional technique is employed, the user gives an instruction to print the data by using the UI, and thereafter the user brings the communication apparatus close to the printer to establish communication. As described above, to transmit the data to the communication partner and cause the communication partner to perform predetermined processing, the user is to input an instruction of the predetermined processing on the UI of the communication apparatus, and then bring the communication apparatus close to the communication partner. Therefore, the user's operation has been cumbersome.

SUMMARY OF THE INVENTION

According to an aspect of the present invention, an apparatus includes a determination unit configured to determine a plurality of applications according to a type of transmission data, a recognition unit configured to recognize a function included in a communication partner, a selection unit configured to select an application from the plurality of applications based on the recognized function, and a transmission unit configured to transmit data to the communication partner using the selected application.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a configuration diagram of a communication system.

FIGS. 2A and 2B are diagrams illustrating hardware configurations of a mobile phone and a printer.

FIG. 4 is a diagram illustrating a display example displayed on the display unit.

DESCRIPTION OF THE EMBODIMENTS

Figure 3:
FIG. 3 is a diagram illustrating a correspondence table.

Various exemplary embodiments, features, and aspects of the invention will be described in detail below with reference to the drawings.

FIG. 1 illustrates a communication system configuration according to a first exemplary embodiment. A mobile phone 101 is a communication apparatus capable of transmitting/receiving data to be communicated (hereinafter "data") using an induced electric field (for example, TransferJet). The mobile phone 101 includes a transmission application, which is a communication application for transmitting data to a communication partner. More specifically, the mobile phone 101 includes a transfer data transmission application to allow the communication partner to store the transmitted data, and a display data transmission application to allow the communication partner to display the transmitted data. Further, the mobile phone 101 includes a print data transmission application to allow the communication partner to print the transmitted data. The print data transmission application converts spread sheet data and word processor data into print data to transmit the data. The print data transmission application can also transmit data directly without converting the data format. The print data transmission application cannot convert image data into print data, and thus the print data transmission application transmits image data directly without converting the data format. Further, the mobile phone 101 includes a streaming data transmission application to transmit moving image data to the communication partner by streaming transmission and allow the communication partner to display the data transmitted in a streaming manner.

A printer 102 is a communication partner of the mobile phone 101 that performs communication using an induced electric field. The printer 102 includes a reception application, which is a communication application for receiving data from a communication partner. More specifically, the printer 102 includes a print data reception application to receive spread sheet data, word processor data, image data, and print data from a communication partner and print the data. The print data reception application can convert spread sheet data, word processor data, and image data into print data, and print the data. Although the print data reception application can receive data transmitted by the print data transmission application, the print data reception application cannot receive data transmitted by the transfer data transmission application and the streaming data transmission application.

A display 103 is a communication partner of the mobile phone 101 that performs communication using an induced electric field. The display 103 includes a streaming data reception application which receives moving image data from a communication partner and reproduces the data in a streaming manner. The streaming data reception application can receive data transmitted by the streaming data transmission application. The display 103 includes a display data reception application for receiving data transmitted by the display data transmission application and displaying the data. A personal computer (PC) 104 is a communication partner of the mobile phone 101 that performs communication using an induced electric field. In the PC 104, a user can select an application to be started or stopped. In the present exemplary embodiment, "application" is software which is executed on a communication apparatus to realize a predetermined function.

FIG. 2A illustrates a hardware configuration of the mobile phone 101. A control unit 201 includes a central processing unit (CPU) or the like. The control unit 201 reads and executes a program stored in a storage unit described below. A storage unit 202 includes a memory such as a random access memory (RAM) and a read only memory (ROM). The storage unit 202 stores a program 230 described below, various data, and the like. Further, the storage unit 202 includes the transfer data transmission application, the print data transmission application, the streaming data transmission application, and the display data transmission application. Further, the storage unit 202 includes a correspondence table 301 illustrated in FIG. 3 in which the types of transmission files (spread sheet data, word processor data, image data, and moving image data) are associated with the transmission applications. By using the correspondence table 301, it is possible to extract a transmission application suitable for the type of transmission file.

Although a file of image data can be transmitted to perform storing, printing, and displaying, the data cannot be transmitted in a streaming manner. Therefore, in the correspondence table 301, when the file to be transmitted is image data, the transfer data transmission application, the print data transmission application, and the display data transmission application are a candidate of the transmission application, but the streaming data transmission application is not a candidate of the transmission application. On the other hand, a file of moving image data is transmitted to perform storing, streaming, and displaying, but is not transmitted to perform printing. Therefore, in the correspondence table 301, when the file to be transmitted is moving image data, the transfer data transmission application, the streaming data transmission application, and the display data transmission application are a candidate of the transmission application, but the print data transmission application is not a candidate of the transmission application. Similarly, the correspondence table 301 can be used as to a file of spreadsheet data and word processor data. By using such a correspondence table 301, it is possible to extract a transmission application suitable for the type of transmission files. In addition, it is possible to prevent a file from being transmitted by a transmission application not suited to the type of the file.

A display unit 203 includes a display device. For example, the display unit 203 performs a display as illustrated in FIG. 4 to allow a user to select a transmission file. An operation unit 204 includes operation keys. The user can select data to be transmitted (hereinafter "transmission file") to a receiving apparatus from data stored in the storage unit 202 via the operation unit 204. The display unit 203 and the operation unit 204 may be constituted by, for example, a touch panel as an integrated unit. A determination unit 205 determines whether the user has selected a transmission file via the operation unit 204. An extraction unit 206 extracts a candidate of an application used to transmit the transmission file based on the type of the transmission file.

A communication unit 207 performs communication using an induced electric field. The communication unit 207 also determines whether communication using an induced electric field can be established and connects to a receiving apparatus through the communication that uses an induced electric field. A request unit 208 transmits a communication application capability request to the receiving apparatus via the communication unit 207. The communication application capability request is a request for acquiring information of applications included in the receiving apparatus. For example, the printer 102 which receives the communication application capability request notifies the mobile phone 101 of information indicating that the printer 102 has a print data reception application, as communication application capability information described below. In this way, the mobile phone 101 can recognize functions that can be performed by the printer 102.

An acquisition unit 209 acquires the communication application capability information transmitted from the receiving apparatus, which responds to the communication application capability request, via the communication unit 207. The communication application capability information is the information of applications included in the receiving apparatus. For example, the communication application capability information is information indicating that the printer 102 includes the print data reception application. Further, the communication application capability information may include additional information, such as information indicating that the print data reception application can convert spread sheet data, word processor data, and image data into print data and print the data.

A determination unit 210 determines the transmission application and the reception application of the transmission file. A judgment unit 211 judges whether the determination unit 210 has determined the applications. An instruction unit 212 instructs the receiving apparatus to start the reception application determined by the determination unit 210 via the communication unit 207. A start-up unit 213 starts the application for transmission determined by the determination unit 210. A disconnection unit 214 ends the application started by the start-up unit 213 and disconnects communication with the communication partner, which uses an induced electric field.

FIG. 2B illustrates a hardware configuration of the printer 102. A control unit 251 includes a CPU or the like. The control unit 251 reads and executes a program stored in a storage unit described below. A storage unit 252 includes a memory such as a RAM and a ROM. The storage unit 252 stores a program described below and the print data reception application. A communication unit 253 performs communication using an induced electric field. A request receiving unit 254 receives the communication application capability request via the communication unit 253.

A notification unit 255 transmits information of the communication applications included in the printer 102 to the transmitting apparatus via the communication unit 253. An instruction receiving unit 256 receives an instruction for starting the application from the transmitting apparatus via the communication unit 253. A start-up unit 257 starts the application based on the instruction received via the instruction receiving unit 256. A disconnection unit 258 ends the application started by the start-up unit 257 and disconnects communication with the communication partner, which uses an induced electric field. A part of the hardware configuration described above may be configured by software.

Although the display 103 and the PC 104 have a similar hardware configuration as the printer 102, content stored in the storage unit is different. More specifically, the storage unit of the display 103 stores a program described below, the streaming data reception application, and the display data reception application. The storage unit of the PC 104 stores a program described below, the transfer data reception application, the streaming data reception application, and the display data reception application. The PC 104 can switch a moving image reproducing application and an image viewer between being operated and being stopped, respectively by a user's operation. The moving image reproducing application can reproduce moving image data received by the streaming data reception application. The image viewer can display various data received by the display data reception application.

Figure 5A:
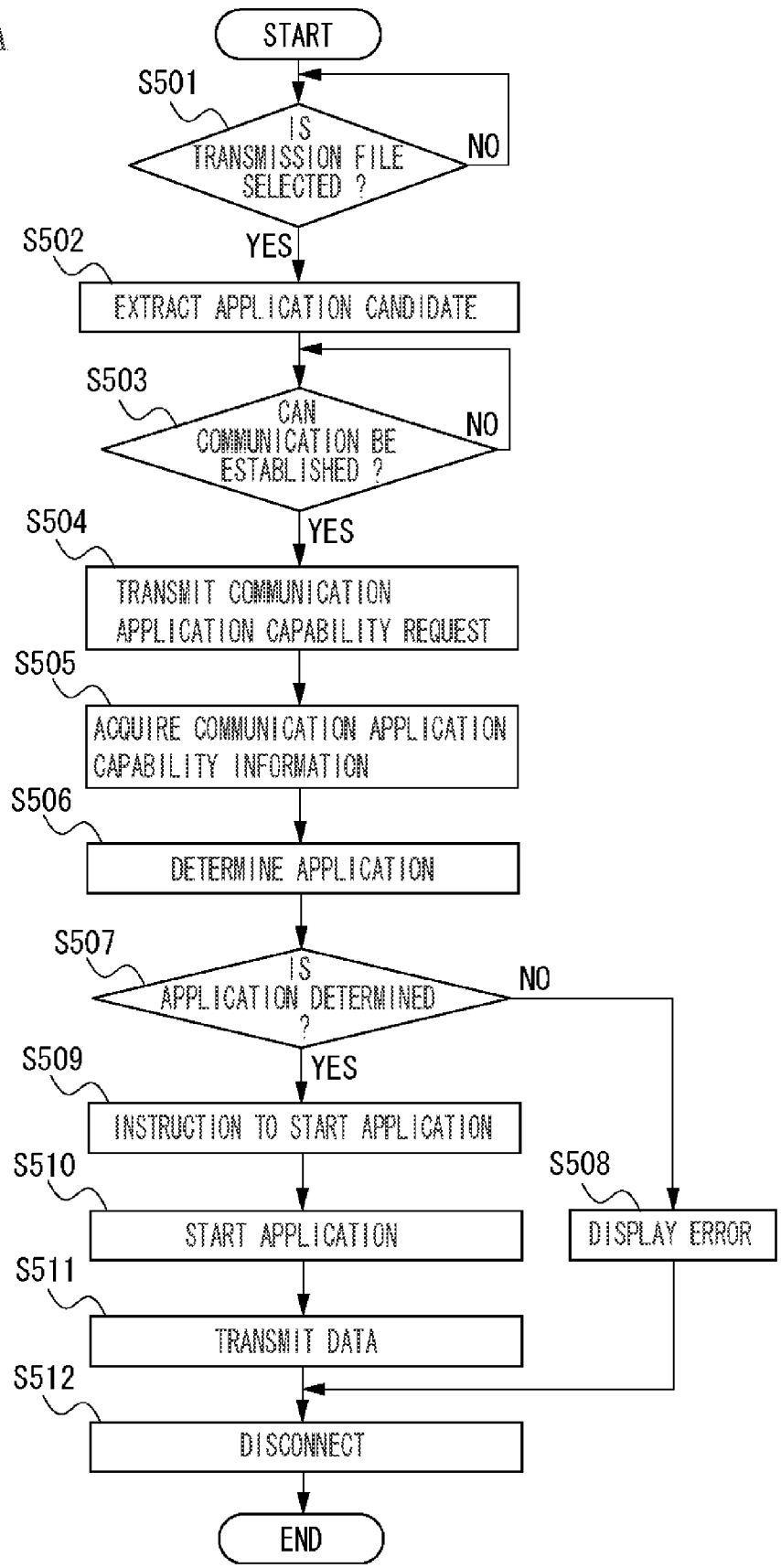
FIGS. 5A and 5B are a flowchart executed by the mobile phone and a flowchart executed by the printer.
Figure 5B:
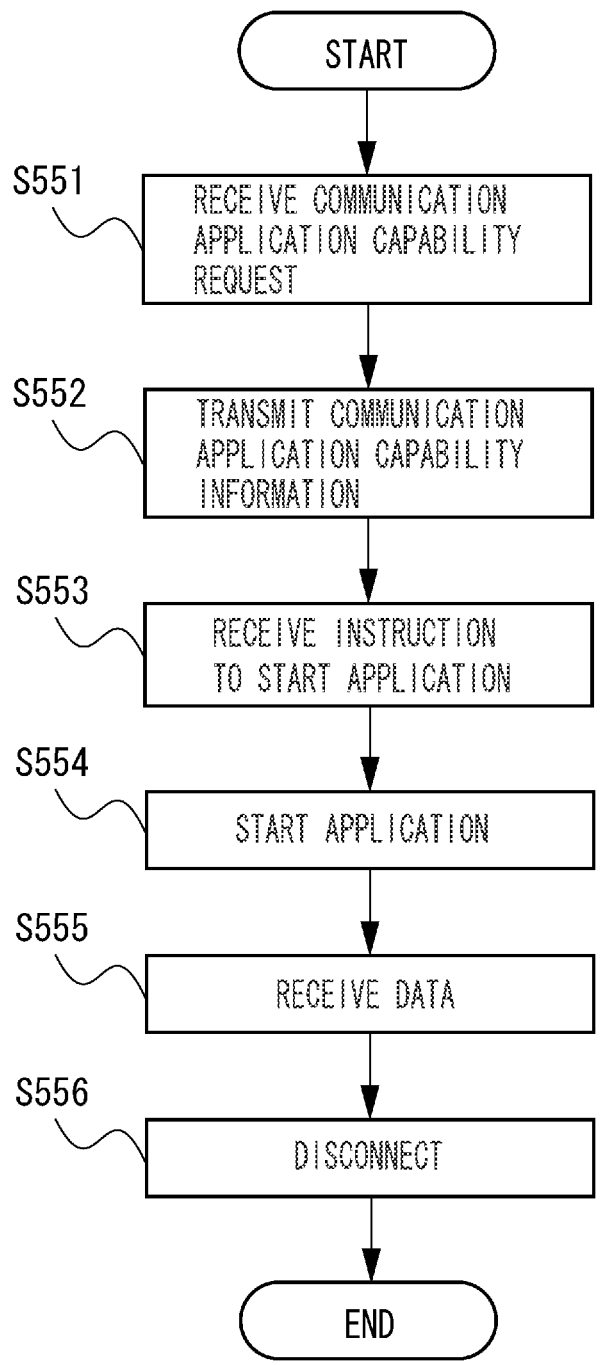

In the present exemplary embodiment, the mobile phone 101 operates as a transmitting apparatus, and the printer 102, the display 103, and the PC 104 operate as a receiving apparatus. Here, a case in which the printer 102 operates as the receiving apparatus will be described. FIG. 5A illustrates a flowchart of a process in which the control unit 201 reads and executes a program stored in the storage unit 202. FIG. 5B illustrates a flowchart of a process in which the control unit 251 reads and executes a program stored in the storage unit 252. In the present exemplary embodiment, the transmission file is selected before transmission data is transmitted/received between the mobile phone 101 and the printer 102 using an induced electric field.

In step S501, in response to an instruction from the control unit 201 of the mobile phone 101, the determination unit 205 determines whether the transmission file has been selected by a user. When it is determined that the transmission file has been selected, the processing proceeds to step S502, and when the transmission file has not been selected, the determination in step S501 is repeated. In this case, the user selects picture003.jpg which is image data. Next, in step S502, in response to an instruction from the control unit 201, the extraction unit 206 extracts a candidate of the transmission application used to transmit the transmission file based on the type of the transmission file. The mobile phone 101 includes the transfer data transmission application, the print data transmission application, the streaming data transmission application, and the display data transmission application, as the transmission application.

Image data is selected as the transmission file. Therefore, the extraction unit 206 refers to the correspondence table 301 illustrated in FIG. 3 and extracts the transfer data transmission application, the print data transmission application, and the display data transmission application from the transfer data transmission application, the print data transmission application, the streaming data transmission application and the display data transmission application. In this way, the transmission applications suitable for transmitting data can be extracted according to the type of the transmission file. The print data transmission application included in the mobile phone 101 cannot convert image data into print data.

Next, in step S503, in response to an instruction from the control unit 201, the communication unit 207 determines whether the communication using an induced electric field can be established. When the communication can be established (in other words, connection is completed), the processing proceeds to step S504. In this case, it is assumed that the communication using an induced electric field can be established by bringing the mobile phone 101 and the printer 102 close together after the user selects the transmission file. In step S504, in response to an instruction from the control unit 201, the request unit 208 transmits the communication application capability request to the receiving apparatus (here, printer 102) via the communication unit 207.

By an instruction from the control unit 251 of the printer 102, the request receiving unit 254 receives the communication application capability request transmitted from the transmitting apparatus (here, mobile phone 101) via the communication unit 253. Next, in step S552, in response to an instruction from the control unit 251, the notification unit 255 transmits the communication application capability information included in the printer 102 to the transmitting apparatus (here, mobile phone 101) via the communication unit 253. In this case, the notification unit 255 notifies the mobile phone 101 that the printer 102 includes the print data reception application. Also, the notification unit 255 notifies the mobile phone 101 of information indicating that the print data reception application can convert spread sheet data, word processor data, and image data into print data and print the data (hereinafter "information about data conversion").

By an instruction from the control unit 201 of the mobile phone 101, the acquisition unit 209 acquires the communication application capability information transmitted from the receiving apparatus (here, printer 102), which responds to the communication application capability request, via the communication unit 207. It is possible to provide a second acquisition unit different from the acquisition unit (first acquisition unit) that acquires the communication application capability information, and the second acquisition unit may acquire the information about data conversion. In this case, the printer 102 transmits the information about data conversion separately from the communication application capability information. In this way, the mobile phone 101 can recognize functions included in the printer 102.

Next, in step S506, in response to an instruction from the control unit 201, the determination unit 210 determines the transmission application to be started in the mobile phone 101 and the reception application to be started in the printer 102 based on the application extracted in step S502 and the information of the application received in step S505. In this case, in step S502, the transfer data transmission application, the print data transmission application (which cannot convert image data into print data), and the display data transmission application are extracted. In step S505, the mobile phone 101 recognizes that the printer 102 includes the print data reception application and can convert spread sheet data, word processor data, and image data into print data to print the data. In this case, when the mobile phone 101 transmits image data by using the transfer data transmission application or the display data transmission application, the print data reception application in the printer 102 cannot receive the data.

However, when the mobile phone 101 transmits image data by using the print data transmission application, the print data reception application in the printer 102 can receive the image data. The print data reception application in the printer 102 can receive the image data, convert the received image data into print data, and print the print data. In this case, it is determined that the mobile phone 101 starts the print data transmission application and causes the printer 102 to start the print data reception application. In this way, processing to be performed (here, printing) for the transmission file is determined according to the functions included in the printer 102 and the type of the transmission file, and further, the applications corresponding to the processing to be performed are selected (here, the print data transmission application and the print data reception application are selected).

For example, when the transmission file is word processor data, the data can be converted into print data in both the mobile phone 101 and the printer 102. In such a case, the mobile phone 101 converts the data into print data, and thereafter transmits the data to the printer 102. Instead of the above operation, the printer 102 may receive word processor data and convert the data into print data. In addition, for example, information indicating that the printer 102 is driven by using a commercial power supply is included in the communication application capability information.

When the mobile phone 101 is driven by a battery and the printer 102 is driven by using a commercial power supply (hereinafter, "driven by a commercial power supply"), the printer 102 driven by a commercial power supply converts the data into print data. In this way, the mobile phone 101 can consume less power than when the mobile phone 101 converts the data into print data. In other words, the consumption of the battery of the mobile phone 101 can be reduced. When the mobile phone 101 is driven by a commercial power supply and the printer 102 is driven by a battery, the mobile phone 101 which is driven by a commercial power supply converts the data into print data. In this way, the printer 102 can consume less power than when the printer 102 converts the data into print data. In other words, the consumption of the battery of the printer 102 can be reduced.

When both the mobile phone 101 and the printer 102 are driven by a commercial power supply or driven by a battery, the printer 102 converts the data into print data. In this way, the mobile phone 101 can consume less power than when the mobile phone 101 converts the data into print data. Instead of the above operation, the communication application capability information may include information indicating a free space in the memory (RAM) in the printer 102, and an apparatus which has larger free space may convert the data into print data. In this way, the speed of data conversion into print data increases.

It is possible to provide a second acquisition unit different from the acquisition unit (first acquisition unit) that acquires the communication application capability information, and the second acquisition unit may acquire the information indicating the free space in the memory (RAM) in the printer 102. In this case, the printer 102 transmits the information indicating the free space in the memory (RAM) in the printer 102 separately from the communication application capability information.

There is a case in which the application to be started is not determined. For example, when only the transfer data transmission application of the transmitting apparatus is extracted in step S502, and the receiving apparatus includes only the print data reception application, data transmission/reception cannot be performed, and thus the applications to be started are not determined. For example, when the print data transmission application of the transmitting apparatus is extracted and the receiving apparatus includes the print data reception application, but when both apparatuses cannot convert data of the transmission file into print data, print cannot be performed, and thus the applications to be started are not determined. In this way, it is possible to prevent an error caused when the transmitted file data cannot be converted into print data from occurring.

When there is no combination of applications by which data can be transmitted/received between the transmitting apparatus and the receiving apparatus, the applications to be started are not determined. In this way, it is possible to prevent a start of combined applications by which data cannot be transmitted/received, and an occurrence of error can be suppressed.

In step S507, in response to an instruction from the control unit 201, the judgment unit 211 judges whether the determination unit 210 has determined the applications to be started in step S506. When the applications have been determined, the processing proceeds to step S509, and when the applications have not been determined, the processing proceeds to step S508. In this case, it is determined that the mobile phone 101 starts the print data transmission application and causes the printer 102 to start the print data reception application, so that the processing proceeds to step S509.

In step S508, in response to an instruction from the control unit 201, the display unit 203 displays (informs of) an error indicating that the communication application cannot be performed, and the processing proceeds to step S512. Besides the error display, the error may be informed by voice or blinking of an LED. In this way, a user can know that the transmission file cannot be transmitted to a communication partner, so that the user convenience improves. The processing may also return to step S501 again, and the user may be prompted to select a transmission file again. In step S509, in response to an instruction from the control unit 201, the instruction unit 212 instructs the receiving apparatus to start the reception application determined by the determination unit 210 in step 506 via the communication unit 207. In this case, the instruction unit 212 instructs the printer 102 to start the print data reception application.

By an instruction from the control unit 251 of the printer 102, in step S553, the instruction receiving unit 256 receives the instruction to start the application from the transmitting apparatus via the communication unit 253. In this case, the instruction receiving unit 256 receives the instruction to start the print data reception application from the mobile phone 101. Even when the instruction to start is not received from the mobile phone 101, if the instruction receiving unit 256 receives information of the reception application, the printer 102 may assume that the information is an instruction to start the reception application. In step S554, in response to an instruction from the control unit 251, the start-up unit 257 starts the application based on the instruction received via the instruction receiving unit 256. In this case, the start-up unit 257 starts the print data reception application.

In response to the instruction from the control unit 201 of the mobile phone 101, in step S510, the start-up unit 213 starts the transmission application determined by the determination unit 210 in step S506. In this case, the start-up unit 213 starts the print data transmission application. In step S511, in response to an instruction from the control unit 201, the started application transmits the transmission file to the receiving apparatus.

In response to the instruction from the control unit 201, the display unit 203 may display information according to the started transmission application when the transmission file is transmitted. For example, when the print data transmission application is started, the display unit 203 displays information indicating that printing is being performed. Also, for example, when the transfer data transmission application is started, the display unit 203 displays information indicating that a file is being transferred. In this way, by displaying information according to the started transmission application, a user can know what communication is being performed, so that the user convenience improves. Furthermore, the communication can be interrupted by the user when a file is being transmitted. In this way, the user can interrupt the communication without waiting for the completion of the transmission of the file, so that the user convenience improves.

When the transmission file has been transmitted to the receiving apparatus, the processing proceeds to step S512. In this case, the print data transmission application transmits picture003.jpg, which is image data, to the printer 102, and when the transmission has been completed, the processing proceeds to step S512. The print data transmission application transmits information for printing such as page setting to the printer 102.

By an instruction from the control unit 251 of the printer 102, in step S555, the reception application receives data transmitted from the transmitting apparatus. In this case, the print data reception application receives data transmitted from the mobile phone 101. Since the received data is image data, the print data reception application converts the received data into print data to print the data. When the reception of the data is completed, the processing proceeds to step S556, and in response to an instruction from the control unit 251, the disconnection unit 258 ends the print data reception application started in step S554, and disconnects communication with the communication partner, which uses an induced electric field.

In response to from the control unit 201 of the mobile phone 101, in step S512, the disconnection unit 214 ends the application started by the start-up unit 213 in step S510, and disconnects the communication with the communication partner, which uses an induced electric field. In this case, the disconnection unit 214 ends the print data transmission application and disconnects the communication with the printer 102, which uses an induced electric field.

As described above, the communication apparatus determines the data transmission application and the data reception application, and starts the applications in the communication apparatus and the communication partner, so that it is possible to simply perform data transmission/reception.

In the above exemplary embodiment, the user selects one transmission file. However, the user may select a plurality of transmission files. For example, when the user selects picture002.jpg and picture003.jpg which are image data, the print data transmission application and the print data reception application are started. Then, the print data transmission application transmits a plurality of files, and the print data reception application receives a plurality of files. In this way, by transmitting a plurality of files at once, it is possible to improve user convenience.

In the first exemplary embodiment, the printer 102 includes the print data reception application. In a second exemplary embodiment, the printer 102 includes the transfer data reception application which receives data from a communication partner and stores the data in a storage medium such as a memory card, in addition to the print data reception application.

In this case, in step S501, it is assumed that the user selects picture003.jpg again as a transmission file. In this case, when the print data transmission application is started as the transmission application and the print data reception application is started as the reception application, data can be transmitted/received. However, when the transfer data transmission application is started as the transmission application and the transfer data reception application is started as the reception application, data can also be transmitted/received. In this case, information indicating that the priority of printing is higher than that of transfer is stored in the storage unit 202 of the mobile phone 101.

In step S506, the determination unit 210 determines that the print data transmission application is started as the transmission application and the print data reception application is started as the reception application according to the priority stored in the storage unit 202. However, applications are not limited to the above combination, and applications which can be combined may be sequentially performed without setting priority. For example, printing may be performed after transfer is performed. Alternatively, data may be transmitted and stored in a memory card, and thereafter the data may be read from the memory card and printed. By doing as described above, even when there is a plurality of combinations of applications by which data can be transmitted/received, data can be transmitted while the user need not start a transmission application and a reception application, so that the user can simply perform data transmission/reception.

For example, in step S501, the user selects picture003.jpg which is image data and movie001.mpg which is moving image data. In this case, in step S506, the transmission application and the reception application are determined for each of picture003.jpg and movie001.mpg. More specifically, when the priority of printing is set higher than the priority of transfer, the print data transmission application is started in step S510, the print data reception application is started in step S554, and picture003.jpg is transmitted/received. Thereafter, the transfer data transmission application is started in step S510, the transfer data reception application is started in step S554, and movie001.mpg is transmitted/received. Therefore, even when data of different types are selected, the user can transmit the data without manually starting the transmission applications and the reception applications, and hence the user can simply perform data transmission/reception.

In addition, the communication application capability information includes the size and the number of print sheets set in the printer 102. Then, it is assumed that not all selected files can be printed even though the files are determined to be transmitted by the print data transmission application in step S506. In this case, between steps S506 and S507, the display unit 203 displays information indicating that not all the files can be printed before the files are transmitted. In this way, the user can know that not all selected image data can be printed before the files are transmitted, so that the user convenience improves.

In addition, the communication application capability information includes information indicating the free space in the memory (RAM) in the printer 102. Then, it is assumed that files are determined to be transmitted by the print data transmission application in step S506 and the free space in the memory is determined to be larger than the total size of the selected files by the control unit 201 between step S506 and step S507. In this case, in step S509, the selected files are transmitted to the printer 102 at one time and stored in the memory, and then an instruction to print the files stored in the memory is issued. In this way, the data is transmitted at one time, and thus the communication time can be shortened. When the free space in the memory is determined by the control unit 201 to be smaller than or equal to the total size of the selected files, the selected files are sequentially transmitted to the printer 102. In this way, even when the free space in the memory of the printer 102 is small, a plurality of files can be transmitted.

It is assumed that the receiving apparatus is the display 103, and the user selects movie001.mpg which is moving image data in step S501. In this case, in step S502, the extraction unit 206 extracts the transfer data transmission application, the streaming data transmission application, and the display data transmission application. In step S505, the acquisition unit 209 acquires information indicating that the receiving apparatus includes the streaming data reception application. Next, in step S506, the determination unit 210 determines that the mobile phone 101 starts the streaming data transmission application and causes the display 103 to start the streaming data reception application.

Furthermore, when the display 103 receives data transmitted from the mobile phone 101, and further includes the transfer data reception application which stores data in a memory card, information indicating the free space in the memory card is included in the communication application capability information. If it is assumed that, in step S506, the free space in the memory card is determined to be smaller than the size of data transmitted from the mobile phone 101 by the control unit 201, the determination unit 210 determines not to start the transfer data transmission application and the transfer data reception application. The determination unit 210 determines to start the streaming data transmission application and the streaming data reception application.

If it is assumed that the free space in the memory card is determined not to be smaller than the size of data transmitted from the mobile phone 101 between step S506 and step S507, in step S506, it is determined to start the transfer data transmission application and the transfer data reception application and store the data in the memory card. In this way, the applications to be started are changed according to the free space in the memory card, so that the user convenience improves.

When the transmission file is selected in step S501, the control unit 201 calculates the transmission time it takes to transmit data in a streaming manner based on the size of the data transmitted by the mobile phone 101. In step S506, it is determined whether the data is transmitted by using the transfer data transmission application or the data is transmitted by using the streaming data transmission application based on the calculated transmission time and the remaining battery level of the mobile phone 101. For example, when the remaining battery level is low, it is determined to transmit data by not using the streaming data transmission application which takes a long time to transmit data. Therefore, when the battery runs out before the selected data has been reproduced in a streaming manner, the data is reproduced after the data has been transmitted, and thus the user convenience improves.

Information indicating that the display 103 is driven by using a commercial power supply or a battery, is included in the communication application capability information. In step S506, for example, it is determined that data is transmitted in a streaming manner when the display 103 is driven by a commercial power supply. On the other hand when the display 103 is driven by a battery, data is reproduced after the data is transmitted. It is possible to provide a second acquisition unit different from the acquisition unit (first acquisition unit) that acquires the communication application capability information. In this case, the second acquisition unit may acquire the information indicating that the display 103 is driven by a commercial power supply or a battery. The display 103 transmits the information indicating that the display 103 is driven by a commercial power supply or a battery separately from the communication application capability information.

When the receiving apparatus is the PC 104, a user can select an application to be started or to be stopped. In this case, in step S552, the receiving apparatus adds the communication application information of currently operating application to the communication application capability information and notifies the mobile phone 101 of the information. For example, when a moving image reproducing application operates in the PC 104, the PC 104 adds information indicating that the PC 104 includes the streaming data reception application to the communication application capability information and transmits the information to the mobile phone 101.

When the moving image reproducing application does not operate, the PC 104 does not add information indicating that the PC 104 includes the streaming data reception application to the communication application capability information. In this way, it is possible to determine applications to be started in the transmitting apparatus and the receiving apparatus according to the application operating in the receiving apparatus, and hence the user can simply perform data transmission/reception. The information indicating that the PC 104 includes the streaming data reception application may be added to the communication application capability information even when the moving image reproducing application is not operating.

When the PC 104 is requested to start the streaming data reception application, the PC 104 starts the moving image reproducing application along with the streaming data reception application. In this way, the application to process the received data is also started according to the type of received data, so that the user convenience improves.

In the first and the second exemplary embodiments, the transmitting apparatus determines the communication applications. In a third exemplary embodiment, the receiving apparatus determines the communication applications.

The communication system configuration according to the present exemplary embodiment is similar to that of the first exemplary embodiment, and hence the description thereof will not be repeated here.

Figure 7A:
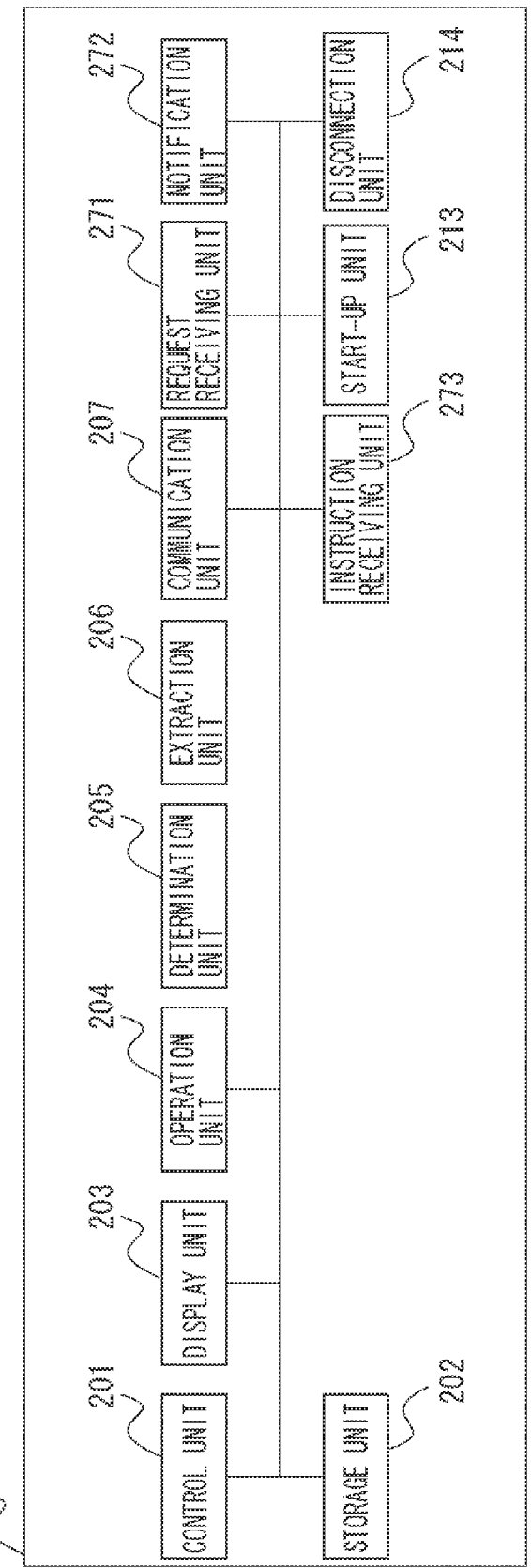
FIGS. 7A and 7B are diagrams illustrating hardware configurations of the mobile phone and the printer.

FIG. 7A illustrates a hardware configuration of the mobile phone 101. The components that are similar to those of the first exemplary embodiment are given the same reference numerals, and the descriptions thereof will not be repeated here. A request receiving unit 271 receives the communication application capability request via the communication unit 253. A notification unit 272 transmits information of the communication applications extracted by the extraction unit 206 to the receiving apparatus via the communication unit 207. The notification unit 272 may transmit information of the communication applications included in the mobile phone 101 to the receiving apparatus. An instruction receiving unit 273 receives an instruction for starting the application from the receiving apparatus via the communication unit 207.

Figure 7B:
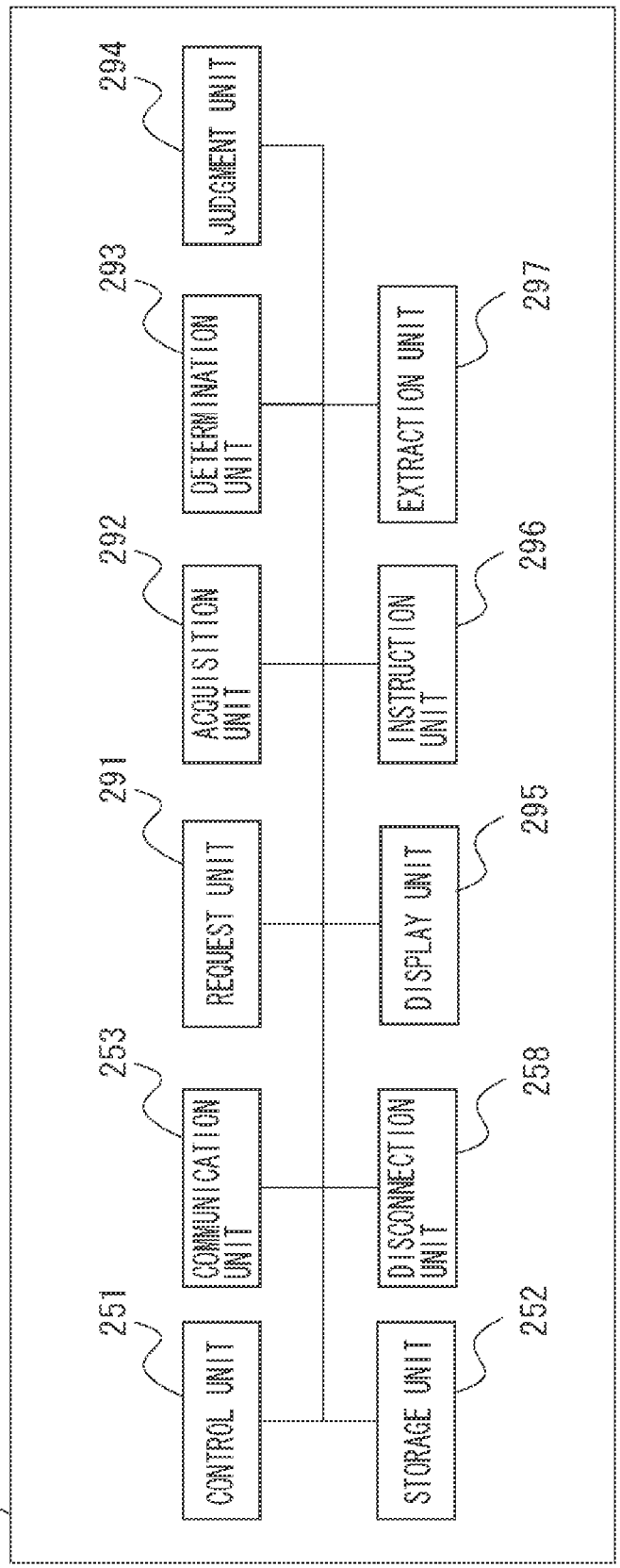

FIG. 7B illustrates a hardware configuration of the printer 102. The components that are similar to those of the first exemplary embodiment are given the same reference numerals, and the descriptions thereof will not be repeated here. A request unit 291 transmits a communication application capability request to the transmitting apparatus via the communication unit 253. An acquisition unit 292 (a third acquisition unit different from the first and the second acquisition units described in the first and the second exemplary embodiments) acquires the communication application capability information transmitted from the transmitting apparatus, which responds to the communication application capability request, via the communication unit 253.

A determination unit 293 determines the transmission application and the reception application of the transmission file. A judgment unit 294 judges whether the determination unit 293 has determined the applications. A display unit 295 includes a display device. An instruction unit 296 gives an instruction to the transmitting apparatus to start the transmission application determined by the determination unit 293 via the communication unit 253. An extraction unit 297 extracts a candidate of an application used for the transmitting apparatus to transmit the transmission file based on the type of the transmission file. In the present exemplary embodiment, the storage unit 252 of the printer 102 records the correspondence table 301.

Figure 6A:
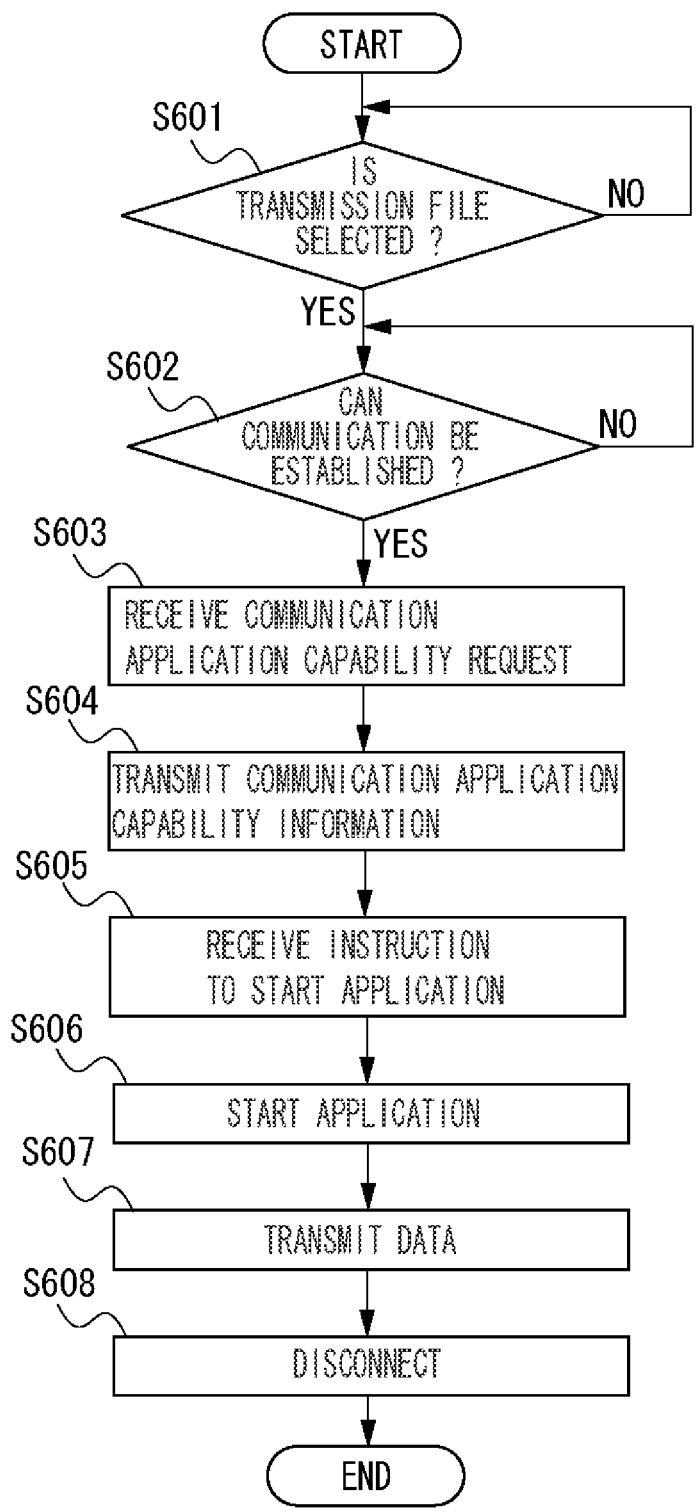
FIGS. 6A and 6B are a flowchart executed by the mobile phone and a flowchart executed by the printer.
Figure 6B:
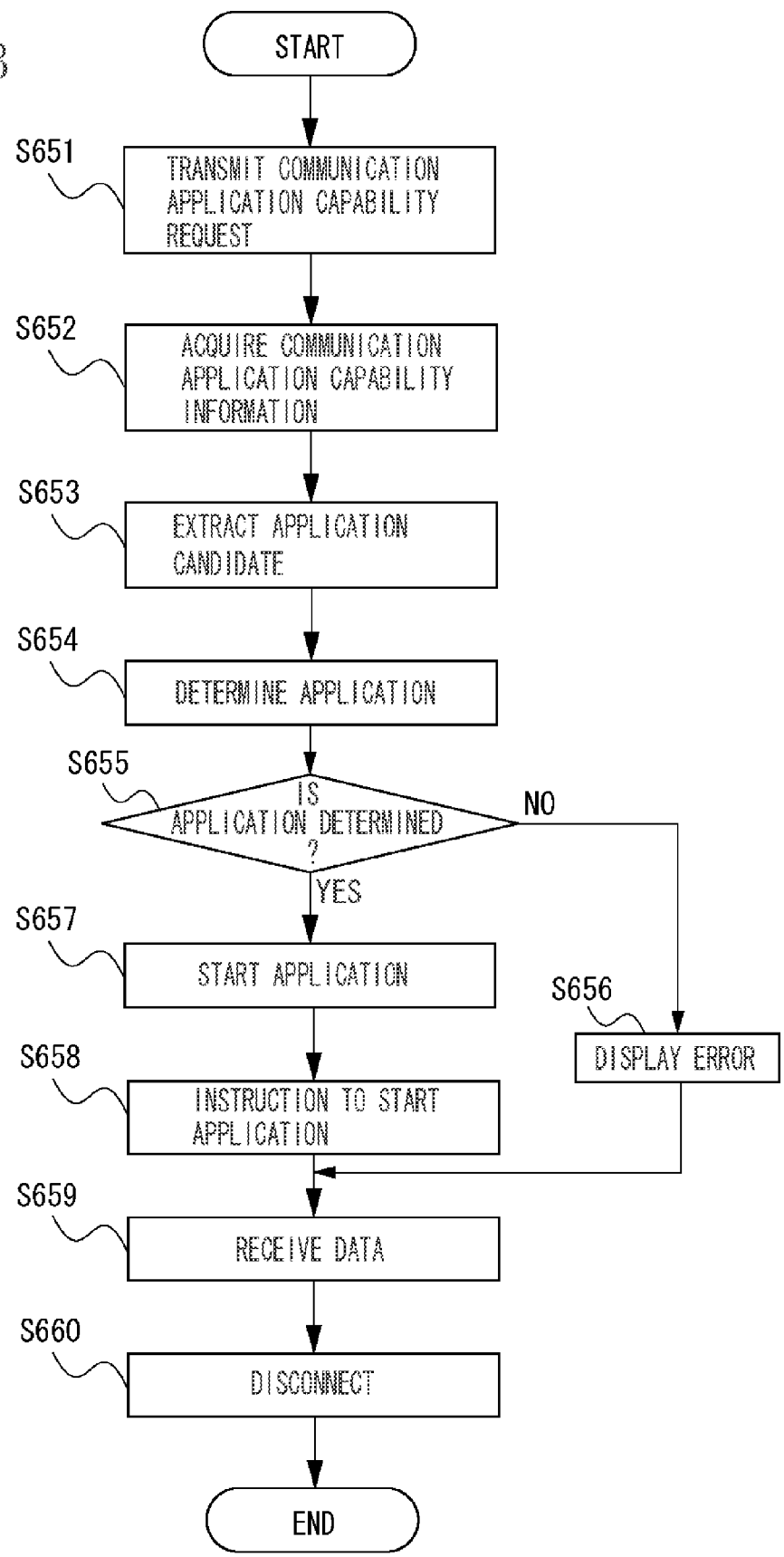

FIG. 6A illustrates a flowchart of a process in which the control unit 201 reads and executes a program stored in the storage unit 202. FIG. 6B illustrates a flowchart of a process in which the control unit 251 reads and executes a program stored in the storage unit 252. The flowchart illustrated FIG. 6B is executed when the communication between the mobile phone 101 and the printer 102 is established.

In step S601, in response to an instruction from the control unit 201 of the mobile phone 101, the determination unit 205 determines whether the transmission file is selected by a user. When it is determined that the transmission file has been selected, the processing proceeds to step S602. When the transmission file has not been selected, the determination in step S601 is repeated. In this case, the user selects picture003.jpg which is image data. Next, in step S602, in response to an instruction from the control unit 201, the communication unit 207 determines whether the communication using an induced electric field can be established. When the communication can be established, the processing proceeds to step S603.

When the communication is established, in step S651, in response to an instruction from the control unit 251 of the printer 102, the request unit 291 transmits the communication application capability request to the transmitting apparatus (here, mobile phone 101) via the communication unit 253.

In the mobile phone 101 to which the communication application capability request is transmitted, in step S603, in response to an instruction from the control unit 201, the request receiving unit 271 receives the communication application capability request.

In step S604, in response to an instruction from the control unit 201, the notification unit 272 makes the communication application capability information which is constituted by information of the transmission applications included in the mobile phone 101 and the type of the file selected in step S601, and transmits the communication application capability information to the receiving apparatus (here, printer 102). In this case, the notification unit 272 transmits to the printer 102 information indicating that the mobile phone 101 includes the transfer data transmission application, the print data transmission application, the streaming data transmission application, and the display data transmission application as the transmission application, and a file of image data is selected. The notification unit 272 may notify the receiving apparatus (here, printer 102) of information indicating a candidate of the transmission application used to transmit the transmission file based on the type of the transmission file, as the communication application capability information. In this way, the receiving apparatus can recognize a transmission application suitable for the type of the transmission file without recognizing the type of the transmission file, and thus the processing load of the receiving apparatus can be reduced.

By an instruction from the control unit 251 of the printer 102, in step S652, the acquisition unit 292 acquires the communication application capability information. Next, in step S653, in response to an instruction from the control unit 201, the extraction unit 297 extracts a candidate of the transmission application used for the transmission apparatus (here, mobile phone 101) to transmit the transmission file based on the type of the transmission file. In this case, information indicating that the mobile phone 101 includes the transfer data transmission application, the print data transmission application, the streaming data transmission application, and the display data transmission application, as the transmission application, is acquired. Also, information indicating that image data is selected as the transmission file is acquired.

Therefore, the extraction unit 297 refers to the correspondence table 301 illustrated in FIG. 3 and extracts the transfer data transmission application, the print data transmission application, and the display data transmission application from the transfer data transmission application, the print data transmission application, the streaming data transmission application, and the display data transmission application. In step S654, the determination unit 293 determines the transmission application to be started in the mobile phone 101 and the reception application to be started in the printer 102 based on the reception applications included in the printer 102 and the application information extracted in step S653. In this case, the printer 102 includes the print data reception application.

In step S653, the transfer data transmission application, the print data transmission application, and the display data transmission application are extracted as the transmission application of the mobile phone 101. In this case, it is determined that the mobile phone 101 starts the print data transmission application and the printer 102 starts the print data reception application. When there is no combination of applications by which data can be transmitted/received between the transmitting apparatus and the receiving apparatus, the applications to be started are not determined.

In step S655, in response to an instruction from the control unit 251, the judgment unit 294 judges whether the determination unit 293 has determined the applications to be started in step S654. When the applications have been determined, the processing proceeds to step S657. On the other hand, when the applications have not been determined, the processing proceeds to step S656. In step S656, in response to an instruction from the control unit 251, the display unit 295 displays an error indicating that the communication application cannot be performed, and the processing proceeds to step S660. In step S657, in response to an instruction from the control unit 251, the start-up unit 257 starts the reception application determined by the determination unit 293 in step S654. In this case, the start-up unit 257 starts the print data reception application.

In step S658, in response to an instruction from the control unit 251, the instruction unit 296 instructs the transmitting apparatus to start the transmission application determined by the determination unit 293 in step 654 via the communication unit 253. In this case, the instruction unit 296 instructs the mobile phone 101 to start the print data transmission application. In this way, by instructing the start of the transmission application after starting the reception application, it is possible to reduce a possibility that the transmission application transmits data before the reception application starts and an error occurs in data reception.

By an instruction from the control unit 201 of the mobile phone 101, in step S605, the instruction receiving unit 273 receives an instruction to start the application from the receiving apparatus via the communication unit 207. In step S606, in response to an instruction from the control unit 201, the start-up unit 213 starts the application based on the instruction received via the instruction receiving unit 273. In this case, the start-up unit 213 starts the print data transmission application. In step S607, in response to an instruction from the control unit 201, the started application transmits the transmission file to the receiving apparatus. When the transmission file has been transmitted to the receiving apparatus, the processing proceeds to step S608. In this case, the print data transmission application transmits picture003.jpg, which is image data, to the printer 102, and when the transmission has been completed, the processing proceeds to step S608.

In step S608, in response to an instruction from the control unit 201, the disconnection unit 214 ends the application started by the start-up unit 213 in step S606, and disconnects the communication with the communication partner, which uses an induced electric field. In this case, the disconnection unit 214 ends the print data transmission application and disconnects the communication with the printer 102, which uses an induced electric field.

In step S659, by an instruction from the control unit 251 of the printer 102, the reception application receives data transmitted from the transmitting apparatus. In this case, the print data reception application receives data transmitted from the mobile phone 101. When the reception of the data is completed, the processing proceeds to step S660, and in response to an instruction from the control unit 251, the disconnection unit 258 ends the reception application (here, the print data reception application) started in step S657, and disconnects communication with the communication partner, which uses an induced electric field.

As described above, the communication apparatus determines the data transmission application and the data reception application, and starts the applications in the communication apparatus and the communication partner, so that it is possible to simply perform data transmission/reception.

In the present invention, it is possible to provide to a system or an apparatus, a computer-readable recording medium in which a program code of software which realizes the above described functions is stored and cause the system or the apparatus to read and execute the program code stored in the recording medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-141388 filed Jun. 12, 2009, which is hereby incorporated by reference herein in its entirety.

What is claimed is:

1. An apparatus comprising:
a communication unit configured to perform near field wireless communication with a communication partner;
a first selection unit configured to select data to be communicated from a plurality of pieces of data; and
an instruction unit configured to instruct the communication partner to perform processing determined based on a type of the selected data and at least one piece of processing performable by the communication partner as processing to be performed on the selected data without the apparatus receiving an operation for performing the processing on the selected data from a user after the communication partner is detected by the near field wireless communication performed by the communication unit, in a case where the communication partner is detected by the near field wireless communication performed by the communication unit while the processing to be performed on the selected data is not specified.

2. The apparatus according to claim 1, wherein the instruction unit notifies the communication partner of information in which the communication partner activates an application for to the processing to be performed on the selected data.

3. The apparatus according to claim 1, further comprising:
a conversion unit configured to convert a format of the selected data according to a type of power supply of the communication partner when the apparatus performs predetermined processing or the communication partner converts the format performs the predetermined processing.

4. The apparatus according to claim 1, further comprising:
a conversion unit configured to convert a format of the selected data according to whether the communication partner can convert the format when the apparatus performs predetermined processing or the communication partner converts the format and performs the predetermined processing.

5. The apparatus according to claim 1, further comprising:
a second selection unit configured to select an application from a plurality of applications based on the processing to be performed on the selected data, wherein the second selection unit selects the application according to a type of the selected data and a free space in a memory of the communication partner.

6. The apparatus according to claim 1, further comprising:
a second selection unit configured to select an application from a plurality of applications based on the processing to be performed on the selected data,
wherein the second selection unit selects the application for each of a plurality of the selected data.

7. The apparatus according to claim 1, further comprising a notice unit configured to notify a user of an error or prompt the user to select data when the processing to be performed on the selected data is not determined.

8. The apparatus according to claim 1, further comprising:
a determination unit configured to determine a plurality of applications according to a type of transmission data;
a recognition unit configured to recognize a function included in a communication partner;
a second selection unit configured to select an application from the plurality of applications based on the recognized function;
a transmission unit configured to transmit the transmission data to the communication partner using the selected application; and
a storage unit configured to store the type of transmission data in a table,
wherein the type of transmission data is associated with the selected application, and
wherein the selected application depends on whether or not the transmission data is a moving image data.

9. The apparatus according to claim 1, wherein the processing to be performed on the selected data is one of a print processing and a streaming processing.

10. The apparatus according to claim 1,
wherein the instruction unit is capable of instructing a communication partner to perform streaming processing in a case where the type of the selected data is in a moving-image format, and
wherein the instruction unit is capable of instructing a communication partner to perform print processing in a case where the type of the selected data is in an image format.

11. The apparatus according to claim 1, wherein the instruction unit is configured to instruct a communication partner to perform print processing in a case where the type of the selected data is in an image format and connection with the communication partner, which is a printer, via the communication unit is established.

12. The apparatus according to claim 11, wherein the instruction unit is configured to instruct a communication partner to perform streaming processing in a case where the type of the selected data is in a moving-image format and connection with the communication partner, which is a display apparatus, via the communication unit is established.

13. A method comprising:
performing near field wireless communication with a communication partner;
selecting data to be communicated from a plurality of pieces of data; and instructing the communication partner to perform processing determined based on a type of the selected data and at least one piece of processing performable by the communication partner as processing to be performed on the selected data without receiving an operation for performing the processing on the selected data from a user after the communication partner is detected by the near field wireless communication, in a case where the communication partner is detected by the near field wireless communication while the processing to be performed on the selected data is not specified.

14. The method according to claim 13, further comprising notifying the communication partner of information in which the communication partner activates an application for the processing to be performed on the selected data.

15. The method according to claim 13, further comprising:
converting a format of the selected data according to a type of power supply of the communication partner.

16. The method according to claim 13, further comprising:
converting a format of the selected data according to whether the communication partner can convert the format.

17. The method according to claim 13, further comprising:
selecting an application from a plurality of applications based on the processing to be performed on the selected data,
wherein the selecting selects the application according to a type of the selected data and a free space in a memory of the communication partner.

18. The method according to claim 13, further comprising:
selecting an application from a plurality of applications based on the processing to be performed on the selected data,
wherein the selecting selects the application for each of a plurality of the selected data.

19. The method according to claim 13, further comprising notifying a user of an error or prompting the user to select data when the processing to be performed on the selected data is not determined.

20. A non-transitory recording medium which stores a computer-executable program to control a communication apparatus, the recording medium storing a program for realizing the control method according to claim 13.

21. The non-transitory recording medium according to claim 20, further comprising notifying the communication partner of information in which the communication partner activates an application for the processing to be performed on the selected data.

22. The non-transitory recording medium according to claim 20, further comprising:
converting a format of the selected data according to a type of power supply of the communication partner.

23. The non-transitory recording medium according to claim 20, further comprising selecting an application from a plurality of applications based on the processing to be performed on the selected data, wherein the selecting selects the application according to a type of the selected data and a free space in a memory of the communication partner.

24. The non-transitory recording medium according to claim 20, further comprising selecting an application from a plurality of applications based on the processing to be performed on the selected data, wherein the selecting selects the application for each of a plurality of the selected data.

25. The non-transitory recording medium according to claim 20, further comprising notifying a user of an error or prompting the user to select data when the processing to be performed on the selected data is not determined.

* * * * *